(12) United States Patent
Hikita

(10) Patent No.: US 6,271,938 B1
(45) Date of Patent: *Aug. 7, 2001

(54) IMAGE PROCESSING DEVICE

(75) Inventor: Toshiya Hikita, Kanagawa (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,241

(22) Filed: Nov. 7, 1997

(30) Foreign Application Priority Data

Nov. 8, 1996  (JP) ................................................. 8-296544

(51) Int. Cl.$^7$ ....................................................... H04N 1/40
(52) U.S. Cl. ........................... 358/443; 358/448; 358/468
(58) Field of Search ................................. 358/468, 443, 358/448, 408, 401, 434, 435, 436, 438, 439

(56) References Cited

U.S. PATENT DOCUMENTS

| | | | |
|---|---|---|---|
| 4,797,706 | * | 1/1989 | Sugishima et al. ................... 358/448 |
| 5,123,063 | * | 6/1992 | Ohkubo ................................. 358/408 |
| 5,175,632 | * | 12/1992 | Hayashi et al. ....................... 358/468 |

* cited by examiner

*Primary Examiner*—Thomas D. Lee
(74) *Attorney, Agent, or Firm*—Oblon, Spivak, McClelland, Maier & Neustadt, P.C.

(57) ABSTRACT

In an image forming device including a plurality of image processing means each having a particular function, control means combines the image processing means in accordance with a requested mode. For example, assume that an image input via first image inputting means should be processed by first image processing means, then processed by second image processing means, and then output via first outputting means. Then, the control means sets particular parameters in each of the first and second image processing means, and sets up an image path extending from the first inputting means to the first outputting means.

9 Claims, 9 Drawing Sheets

IMAGE PROCESSING DEVICE

BACKGROUND OF THE INVENTION

The present invention relates to an image processing device including a plurality of image processing means each having a particular function.

A color image recording apparatus including image processing means having a plurality of functions is disclosed in, e.g., Japanese Patent Laid-Open Publication No. 2-67076. The functions assigned to the image processing means include shading correction, positional deviation correction, MTF (Modulation Transfer Function) correction, magnification change, gamma correction, color correction, UCR (Under Color Removal), and tonality processing. While two or more of such functions can be executed in combination, they are executed only in a preselected order, i.e., signals are transferred in a preselected order. Let this kind of control be referred to as sequential control. The problem with the sequential control is that it needs a complicated input system and a complicated output system and cannot deal with simultaneous requests each requiring a particular function. This is particularly true with a digital copier often combined with a facsimile apparatus or a printer in order to meet a variety of needs. In addition, functional limitations are not avoidable when the functions are complicated, when a plurality of inputs and a plurality of outputs occur at the same time, or when a plurality of functions are required at the same time.

SUMMARY OF THE INVENTION

It is therefore an object of the present invention to provide an image processing device capable of processing an image efficiently without any functional limitation even when the functions are complicated, when a plurality of inputs and a plurality of outputs occur at the same time, or when a plurality of functions are required at the same time.

In accordance with the present invention, an image processing device has at least two image inputting means each for inputting a digital image, at least two image outputting means each for outputting a digital image, a plurality of image processing means each having a particular image processing function, and control means for combining the image processing means in accordance with a requested mode.

Also, in accordance with the present invention, an image processing device has at least two image inputting means each for inputting a digital image, at least two image outputting means each for outputting a digital image, a plurality of image processing means each having a particular image processing function, managing means for managing the image processing means divided into groups, and control means for combining the groups in accordance with a requested mode.

Further, in accordance with the present invention, an image processing device has at least two image inputting means each for inputting a digital image, at least two image outputting means each for outputting a digital image, a plurality of image processing means each having a particular image processing function, managing means for managing the image processing means on an input and output basis, and control means for controlling the image processing means managed on an input and output basis in response to a requested mode.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
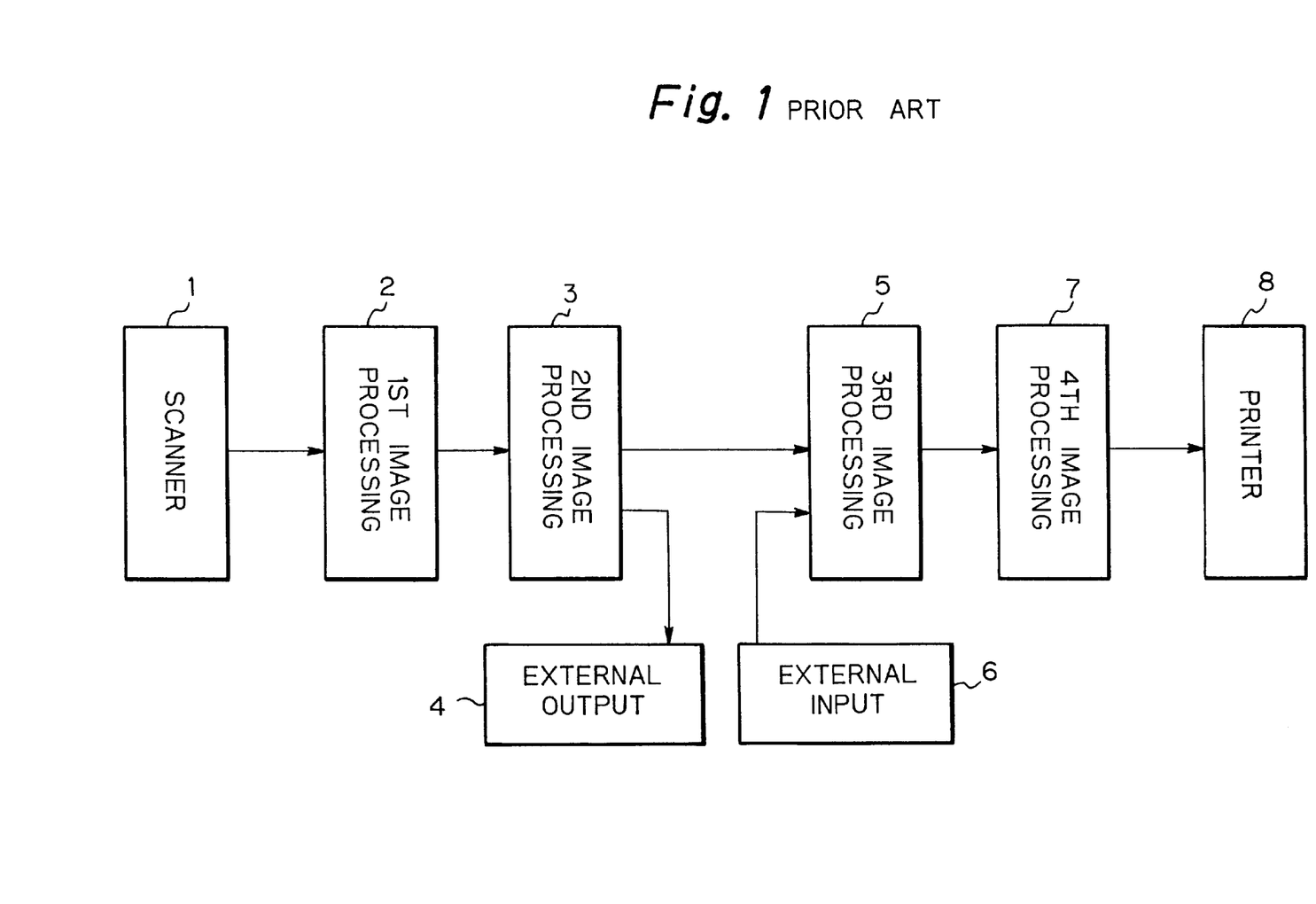
FIG. 1 is a block diagram schematically showing a conventional sequential control type image processing device having a plurality of functions.

To better understand the present invention, brief reference will be made to a conventional sequential control type image processing device having a plurality of functions, shown in FIG. 1. As shown, the device includes a first image processing 2 receiving image data output from a scanner 1 and representative of an image. The first image processing 2 processes the image data on the basis of a function assigned thereto. A second image processing 3 processes image data output of the image processing 2 on the basis of a function assigned thereto. The image data output from the second image processing 3 are fed to an external output 4 and a third image processing 3. The external output 4 outputs a signal corresponding to the input image data. The third image processing 5 executes a function assigned thereto in accordance with an input fed thereto via an external input 6. A fourth image processing 7 executes preselected processing. Finally, a printer 8 produces a printing. In this manner, the conventional device sequentially executes preselected functions.

Figure 2:
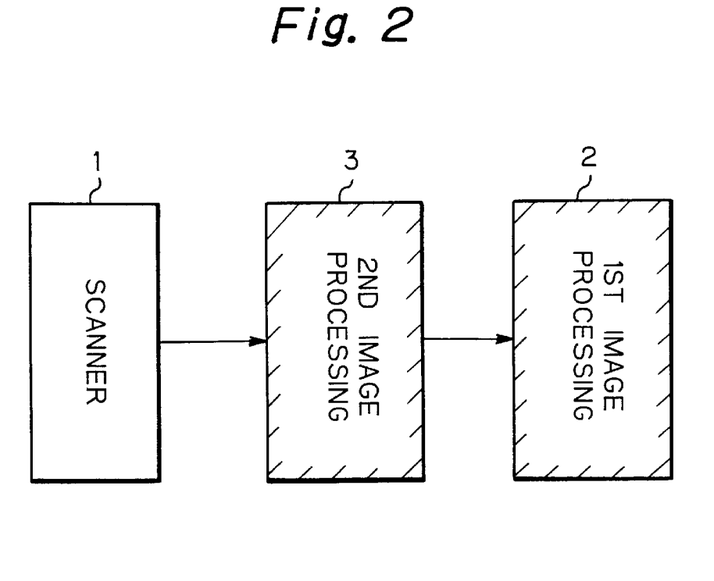
FIGS. 2–4 each shows a particular image processing sequence.
Figure 3:
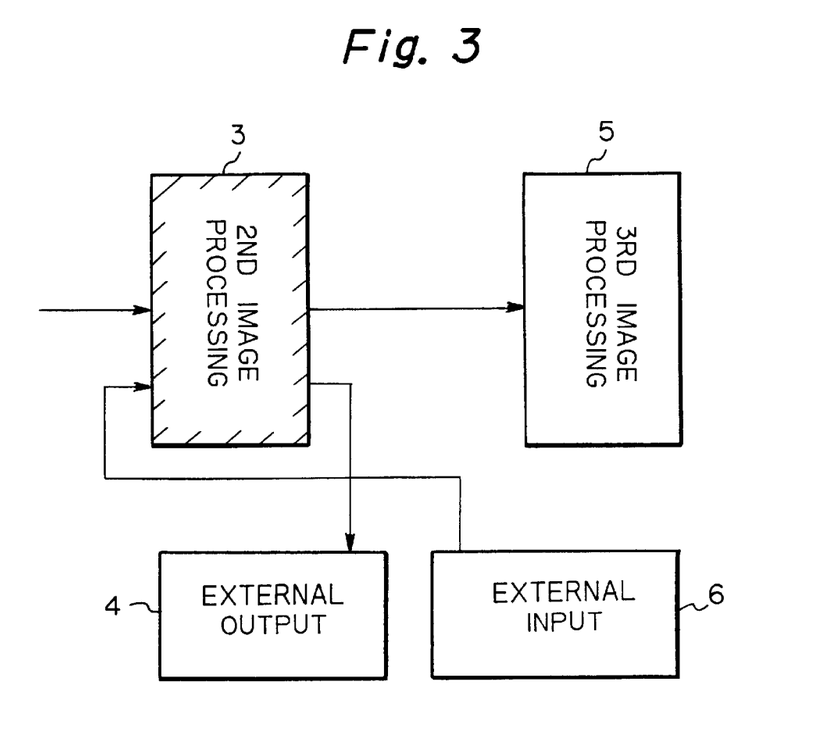
Figure 4:
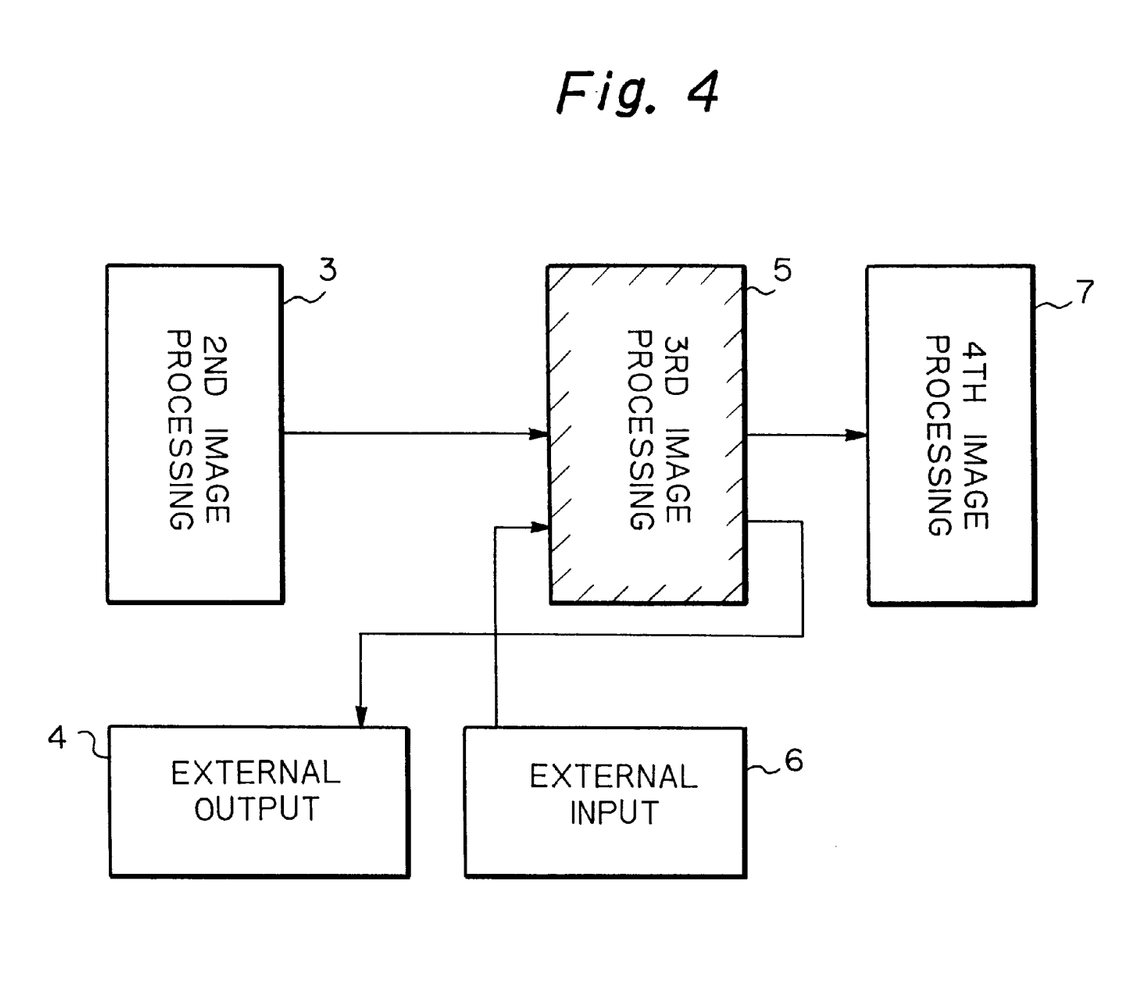

The above sequential image processing device suffers from functional limitations when the functions are complicated, when a plurality of inputs and a plurality of output occur at the same time, or when a plurality of functions are required at the same time. For example, the device cannot deal with a change in the sequence of processing shown in FIG. 2, a plurality of simultaneous inputs and outputs shown in FIG. 3, or two different kinds of outputs to occur during the course of processing.

Figure 5:
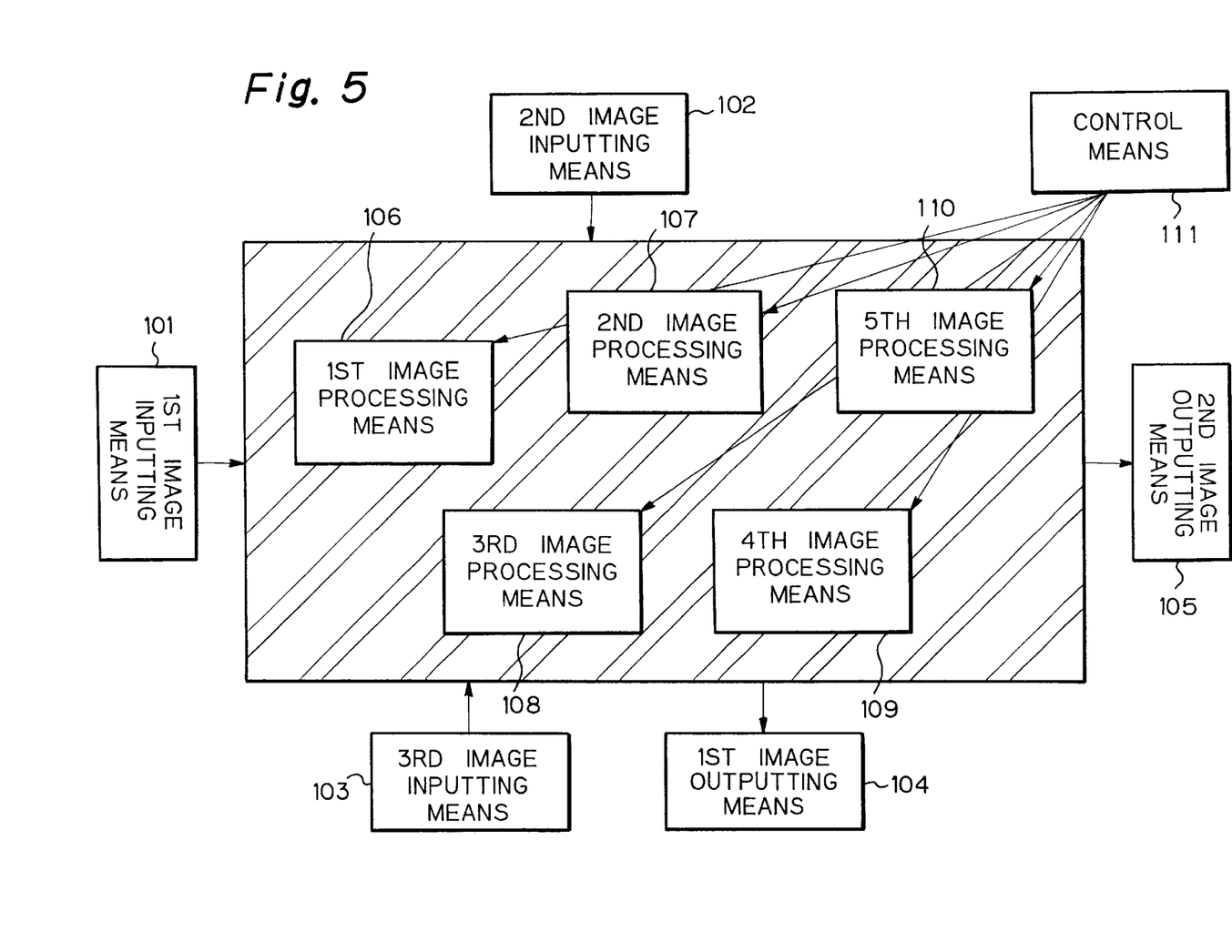
FIGS. 5–10 are schematic block diagrams respectively showing a first to a sixth embodiment of the image processing device in accordance with the present invention.

Referring to FIG. 5, a first embodiment of the image processing device in accordance with the present invention will be described. As shown, the device has first to third image inputting means 101–103, first and second image outputting means 105 and 106, and first to fifth image processing means 106–110 each having a particular function. Conventional MTF correction, magnification change, gamma corrections dither processing, tonality processing and edge enhancement are suitably assigned to the image processing means 106–110. Control means 111 controls the combination of the image processing means 106–110.

In operation, the control means 111 combines the image processing means 106–110 in accordance with a requested mode set. For example, assume that an image input via the first image inputting means 101 should be processed by the first image processing means 106, then processed by the second image processing means 107, and then output via the first image outputting means 109. Then, the controller 111 sets particular parameters in each of the image processing means 106 and 107. An image signal is fed from the first image inputting means 101 to the second image processing means 106 and then to the second image processing means 107.

Figure 6:
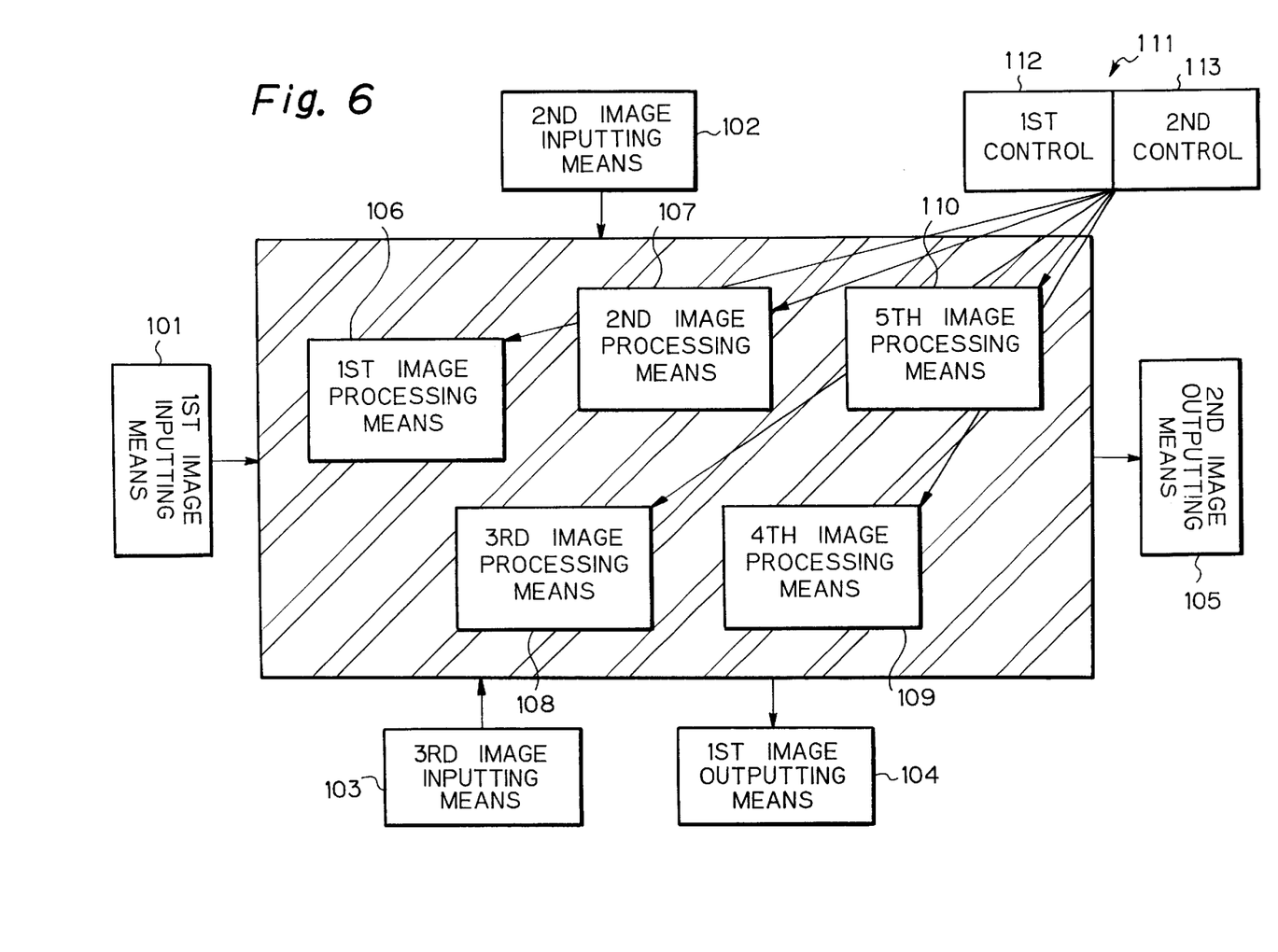

FIG. 6 shows a second embodiment of the present invention. As shown, this embodiment is identical with the first embodiment except that a plurality of requested modes set are divided from each other. Specifically, the control means 111 is made up of a first and a second control 112 and 113, respectively, each being assigned to one of a first and a second requested mode.

For example, in a first requested mode, an image is input to the device via the first inputting means 101 while the first and second image processing means 106 and 107 sequentially process the input image in this order. The processed image output from the image processing means 107 is fed out via the first image outputting means 104. In a second requested mode, the fourth and third image processing means 109 and 108 sequentially process an image input via the second image inputting means 102 in this order. The resulting processing image is fed out via the second image outputting means 105.

The first control 112 of the control means 111 sets, in response to a first request, particular parameters in each of the image processing means 106 and 107, and sets up an image path along which an image signal flows from the image processing means 106 to the image processing means 107. The second control 113 sets, in response to a second request, particular parameters in each of the image processing means 108 and 109, and sets up an image path along which an image signal flows from the image processing means 109 to the image processing means 108.

As stated above, the second embodiment sets parameters only in the image processing means necessary for dealing with the input request, and controls the processing sequence also in accordance with the input request. Further, this embodiment executes a plurality of requests at the same time so long as required image processing functions do not overlap.

Figure 7:
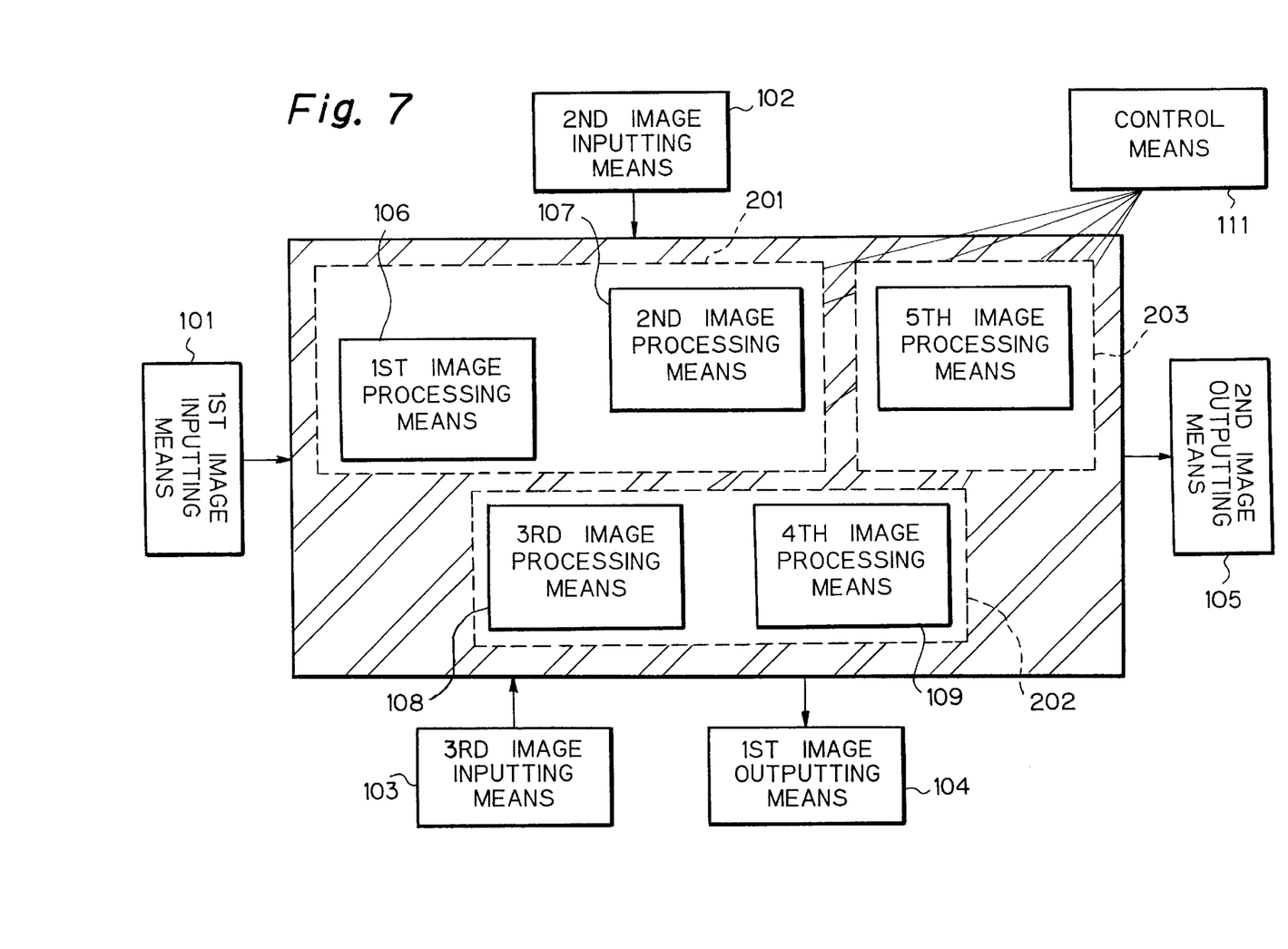

FIG. 7 shows a third embodiment of the present invention. As shown, this embodiment is identical with the first embodiment except that the processing means are divided into groups. Specifically, the control means 111 controls and constructs image processing groups 201, 202 and 203 in response to a requested mode. In the illustrative embodiment, a first image processing group 201 has the first and second image processing means 106 and 107 while a second image processing group 202 has the third and fourth image processing means 108 and 109. A third image processing group 203 is implemented by the fifth image processing means 110. Assume that an image input via the first image inputting means 101 should be processed by the image processing group 201 and then output via the image outputting means 104. Then, the control means 111 sets particular parameters in each of the image processing means 106 and 107 belonging to the first group 201, and constructs paths between the groups. Likewise, in response to any other requested mode, the control means 111 sets up adequate paths between the groups while controlling the groups.

Figure 8:
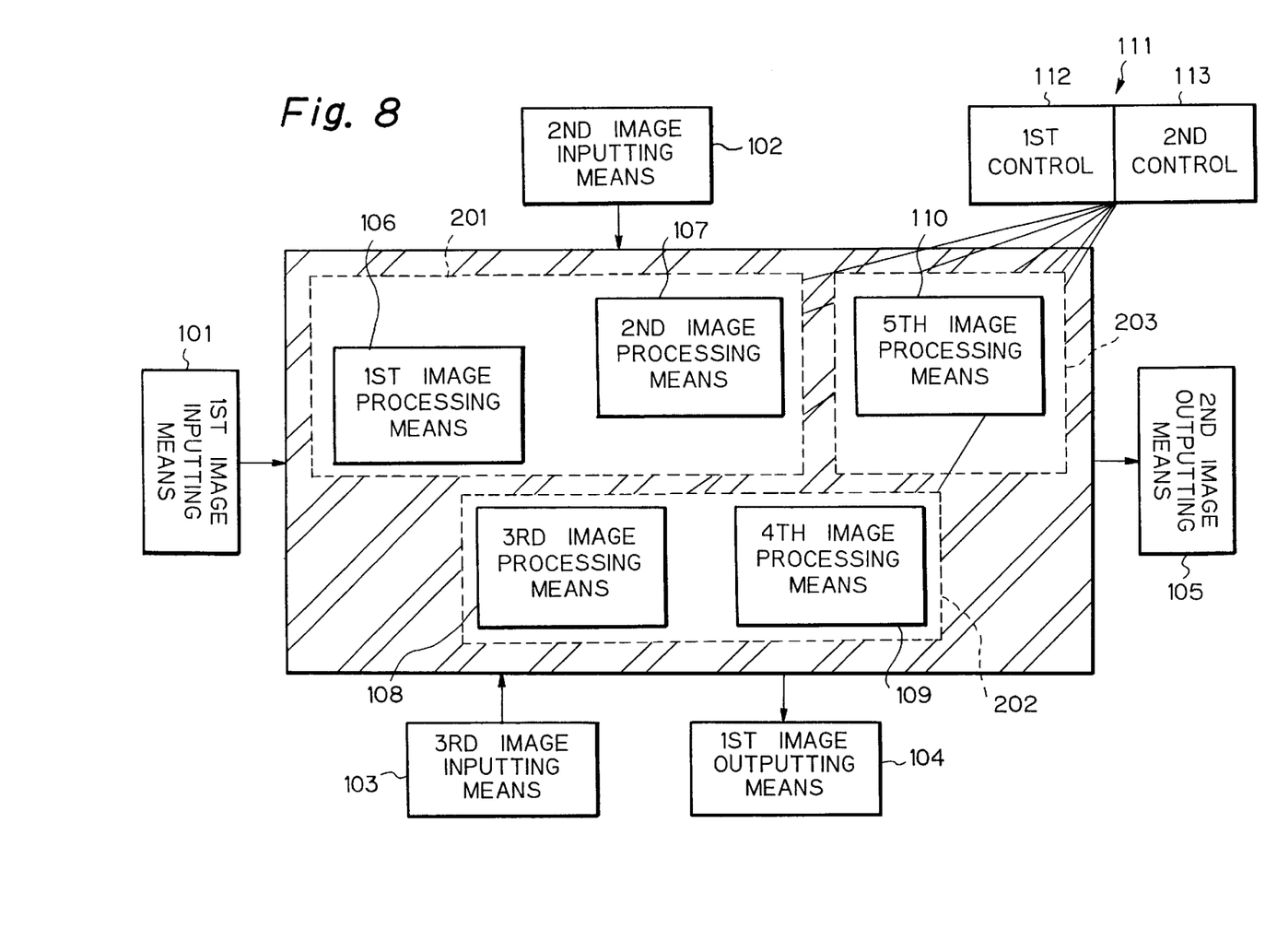

Referring to FIG. 8, a fourth embodiment of the present invention is shown which is the combination of the second and third embodiments. As shown, the first and second controls 112 and 113 of the second embodiment are added to the third embodiment. As for the rest of the construction, the fourth embodiment is identical with the first embodiment.

As shown in FIG. 8, a plurality of request modes set in the control means 111 in accordance preset request modes are divided. Assume two different request modes by way of example. The controls 112 and 113 each controls, in response to the respective request mode, any one of the image processing groups 201–203 while constructing it. Again, the first image processing group 201 has the first and second image processing means 106 and 107 while the second image processing means 202 has the third and fourth image processing means 108 and 109. The third image processing group 203 is implemented by the fifth image processing means 110.

Assume that in response to a first request an image input via the first image inputting means 101 should be processed by the first image processing group 201 and then output via the first image outputting means 104. Then, the first control 112 sets particular parameters in each of the image processing means 106 and 107 belonging to the first group 201, and constructs an image path between the groups. Assume that in response to a second request an image input via the second image inputting means 102 should be processed by the second image processing group and then output via the second image outputting means 105. Then, the second control 112 sets particular parameters in each of the image processing means 108 and 109 belonging to the second group 202, and constructs an image path between the groups. In this manner, the fourth embodiment sets parameters only in the image processing means necessary for dealing with the input request, and controls the connection and disconnection between the groups also in accordance with the input request.

Figure 9:
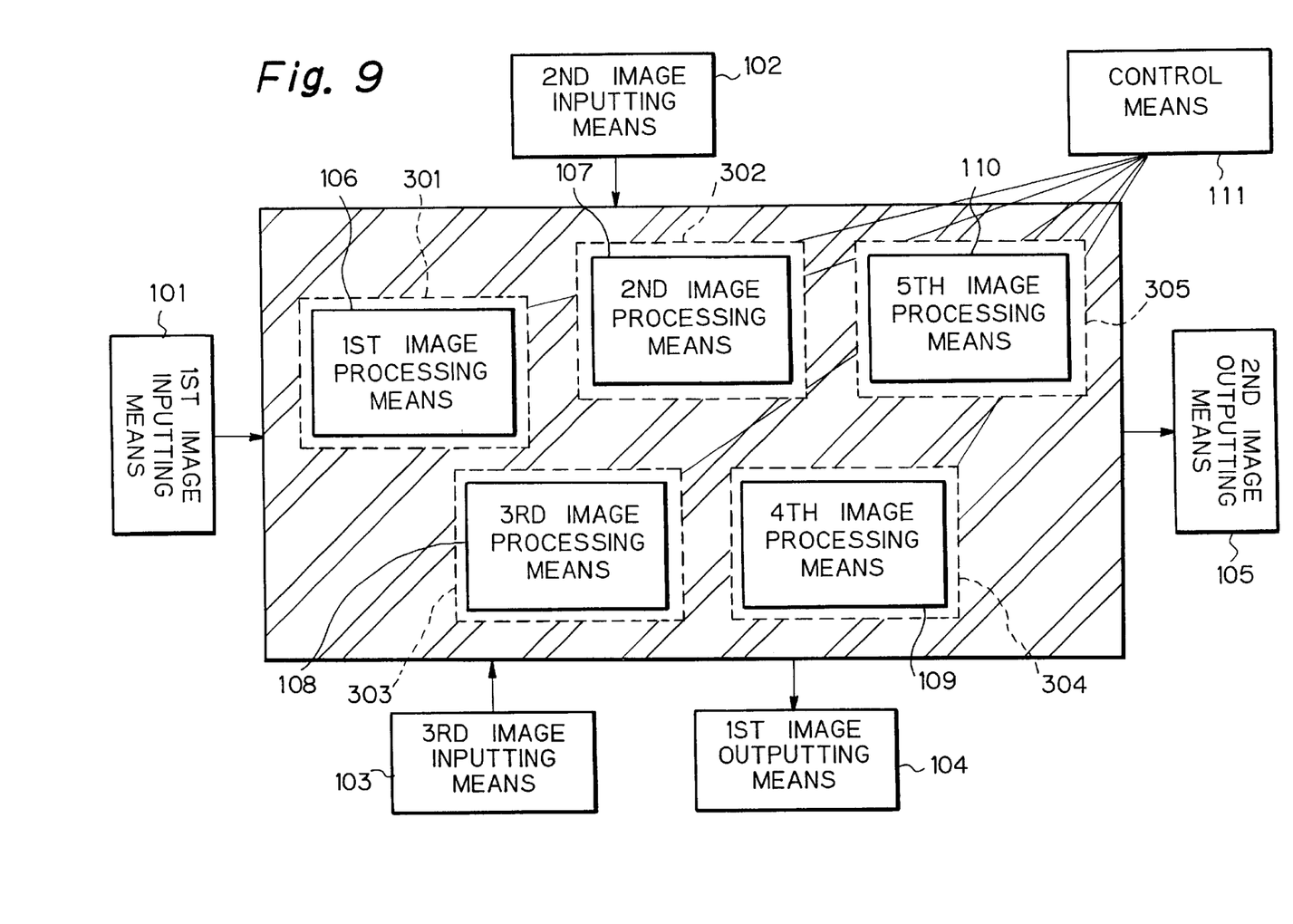

A fifth embodiment of the present invention will be described with reference to FIG. 9. This embodiment is identical with the first embodiment except that the processing means are divided into groups each being assigned to a particular input and a particular output. The image processing means are controlled in groups and suitably combined in order to deal with various requests. In the illustrative embodiment, the first to fifth image processing means 106–110 respectively constitute a first and a fifth image processing group 301–305. In operation, the control means 111 controls and combines the image processing groups 301–305 in accordance with a request mode set. For example, assume that an image should be input via the first image inputting means, subjected to required image processing, and then output via the first image outputting means 104. Then, the control means 111 sets particular parameters in each of the first and fifth image processing groups 301 and 305 belonging to the control of the image inputting means 101 and image outputting means 104, respectively, and constructs an image path from the inputting means 101 to the outputting means 104. The fourth embodiment sets parameters only in the image processing means controlled by the inputting means and outputting means expected to deal with the input request, and controls the connection between the input and the output also in accordance with the input request.

Figure 10:
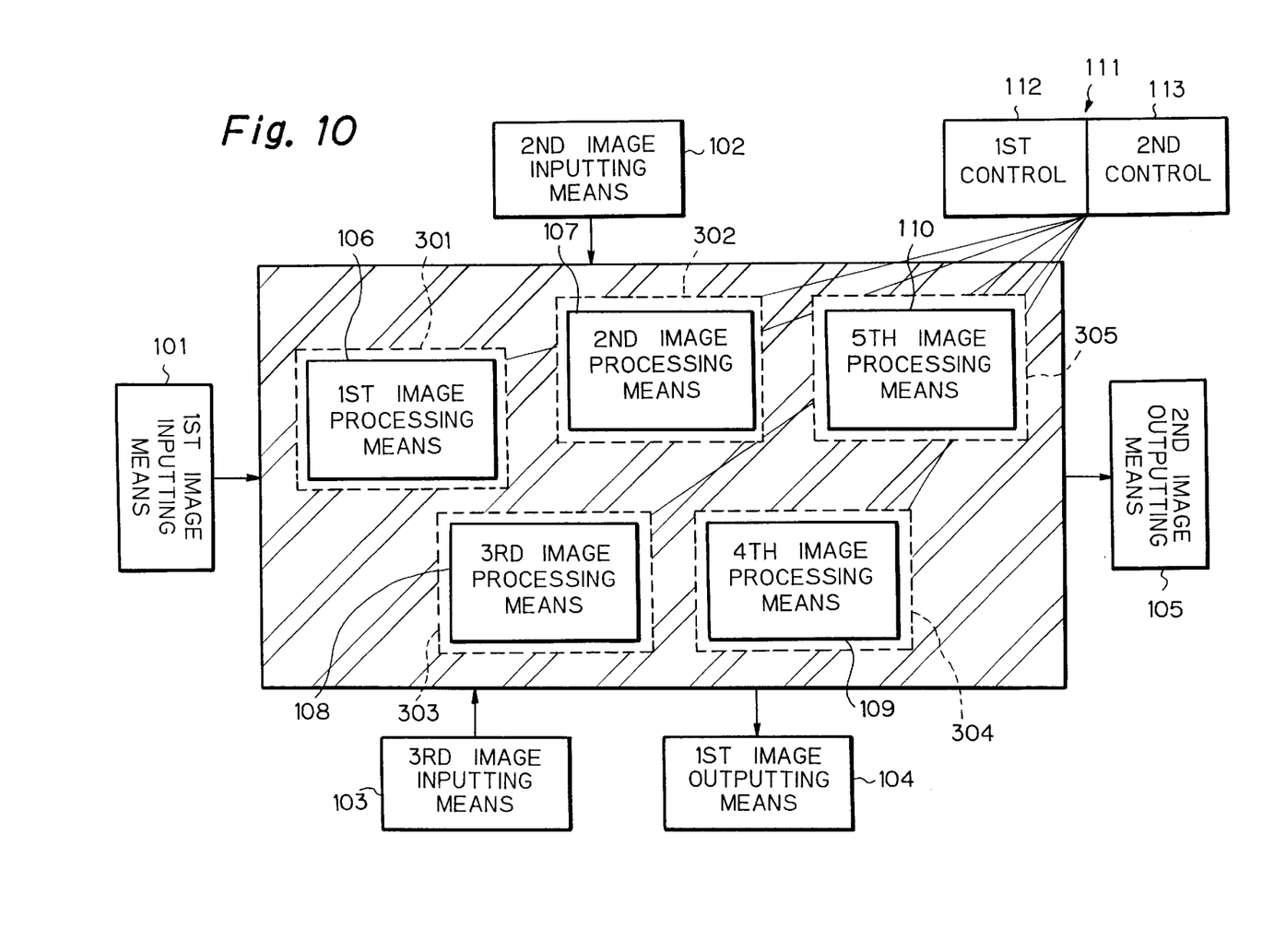

FIG. 10 shows a sixth embodiment of the present invention identical with the fifth embodiment except that the control means of the fourth embodiment is applied thereto. This embodiment, like the fifth embodiment, controls the grouped image processing means on an input and output basis. The first and second controls 112 and 113 of the control means 111 each controls and combines the image processing means 301–305 on an input and output basis for dealing with a request.

Specifically, the control means 111 divides a plurality of preset request modes, e.g., two request modes in the embodiment. For example, assume that in a first request mode an image input via the first image inputting means 101 should be subjected to required processing and then output via the first image outputting means 104. Also, assume that in a second request mode, an image input via the second image inputting means 102 should be subjected to required processing and then output via the second image outputting means 105. Then, in response to the first request, the first control 112 sets particular parameters in each of the first image processing means 106 and fourth image processing means 109 belonging to the control assigned to the inputting means 101 and outputting means 104, and constructs an image path. In response to the second request, the second control 113 sets particular parameters in each of the second image processing means 107 and fifth image processing means 110 belonging to the control assigned to the inputting means 102 and outputting means 105, and constructs an image path. This embodiment also sets parameters only in the image processing means controlled by the inputting means and outputting means necessary for dealing with a request, and controls the connection between the input and the output also in accordance with the request.

It is to be noted that the control means 111 or the first and second control means 113 shown and described each plays the role of arbitrating means.

In summary, it will be seen that the present invention provides an image processing device capable of combining a plurality of image processing means each having a particular function on a group basis, and therefore executing image processing on an input and output basis. This realizes efficient image processing even when a plurality of inputs and a plurality of outputs occur at the same time. Further, it is possible to control the image processing means while preserving the extendibility of connection and disconnection on an input and output basis. In addition, arbitrating means arbitrates a plurality of requested modes and thereby obviates functional limitations, promoting the effective use of image processing resources.

Various modifications will become possible for those skilled in the art after receiving the teachings of the present disclosure without departing from the scope thereof.

What is claimed is:

1. An image processing device comprising:
   at least two image inputting means each for inputting a digital image;
   at least two image outputting means each for outputting the digital image;
   a plurality of image processing means for processing the digital image input by at least one of said at least two image inputting means by manipulating the digital image based on a corresponding image processing function of each image processing means, each image processing function corresponding to a particular type of image manipulation;
   control means coupled to each of the plurality of image processing means, for setting parameters of said plurality of image processing means in accordance with a requested mode and for controlling said plurality of image processing means in combination in accordance with said requested mode;
   wherein the control means is directly connected to each of the plurality of image processing means.

2. A device as claimed in claim 1, further comprising arbitrating means for arbitrating a plurality of requested modes.

3. A device as claimed in claim 1, wherein the image processing function for each of the plurality of image processing means is selected from the group consisting of: MTF correction, magnification change, gamma correction, dither processing, tonality processing, and edge enhancement.

4. An image processing device comprising:
   at least two image inputting means each for inputting a digital image;
   at least two image outputting means each for outputting the digital image;
   a plurality of image processing means for processing the digital image input by at least one of said at least two image inputting means by manipulating the digital image based on a corresponding image processing function of each image processing means, each image processing function corresponding to a particular type of image manipulation;
   managing means for managing said plurality of image processing means divided into groups; and
   control means coupled to each of the plurality of image processing means, for setting parameters of said plurality of image processing means in accordance with a requested mode and for controlling said groups in combination in accordance with said requested mode;
   wherein the control means is directly connected to each of the plurality of image processing means.

5. A device as claimed in claim 4, further comprising arbitrating means for arbitrating a plurality of requested modes.

6. A device as claimed in claim 4, wherein the image processing function for each of the plurality of image processing means is selected from the group consisting of: MTF correction, magnification change, gamma correction, dither processing, tonality processing, and edge enhancement.

7. An image processing device comprising:
   at least two image inputting means each for inputting a digital image;
   at least two image outputting means each for outputting the digital image;
   a plurality of image processing means for processing the digital image input by at least one of said two image inputting means by manipulating the digital means based on a corresponding image processing function of each image processing means, each image processing function corresponding to a particular type of image manipulation;
   managing means for managing said plurality of image processing means on an input and output basis; and
   control means coupled to each of the plurality of image processing means, for setting parameters of said plurality of image processing means in accordance with a requested mode and for controlling said plurality of image processing means managed on an input and output basis in response to said requested mode;
   wherein the control means is directly connected to each of the plurality of image processing means.

8. A device as claimed in claim 7, further comprising arbitrating means for arbitrating a plurality of requested modes.

9. A device as claimed in claim 7, wherein the image processing function for each of the plurality of image processing means is selected form the group consisting of: MTF correction, magnification change, gamma correction, dither processing, tonality processing, and edge enhancement.

* * * * *